United States Patent [19]

Nishida et al.

[11] Patent Number: 5,668,363
[45] Date of Patent: Sep. 16, 1997

[54] OPTICAL READING APPARATUS FOR READING LATENT IMAGE MARK

[75] Inventors: Masato Nishida, Kyoto; Tomoaki Ishituka, Otokuni-gun; Toshio Oshima, Osaka, all of Japan

[73] Assignee: Hitachi Maxell, Ltd., Osaka, Japan

[21] Appl. No.: 367,355

[22] PCT Filed: May 13, 1994

[86] PCT No.: PCT/JP94/00778

§ 371 Date: Jan. 17, 1995

§ 102(e) Date: Jan. 17, 1995

[87] PCT Pub. No.: WO94/27242

PCT Pub. Date: Nov. 24, 1994

[30] Foreign Application Priority Data

May 17, 1993 [JP] Japan ................................. 5-114614

[51] Int. Cl.⁶ ........................... G06K 7/10; B42D 15/00
[52] U.S. Cl. ........................ 235/468; 283/92; 283/901
[58] Field of Search ............................ 235/468, 454, 235/491, 471; 250/271, 239; 283/92, 901, 204

[56] References Cited

U.S. PATENT DOCUMENTS

| | | |
|---|---|---|
| 4,743,773 | 5/1988 | Kanata et al. ................ 235/472 |
| 4,758,716 | 7/1988 | Mayer et al. ................. 235/470 |
| 5,210,411 | 5/1993 | Oshima ..................... 235/463 X |
| 5,463,212 | 10/1995 | Oshima et al. ............... 235/454 X |

FOREIGN PATENT DOCUMENTS

| | | | |
|---|---|---|---|
| 0300729 | 1/1989 | European Pat. Off. | ............. 235/468 |
| 0009600 | 1/1978 | Japan | .................... 235/454 |
| 59-121474 | 7/1984 | Japan | .................... 235/462 |
| 60-83184 | 5/1985 | Japan | .................... 235/462 |

*Primary Examiner*—Donald I. Hajec
*Assistant Examiner*—Thiew Minh Le
*Attorney, Agent, or Firm*—Birch, Stewart, Kolasch & Birch, LLP

[57] ABSTRACT

A high-reliability optical reading apparatus for reading a latent image mark capable of accurately reading the code information of a latent image mark. The optical reading apparatus comprises a light-projecting light member for projecting on a surface of the latent image mark, the light having a wavelength to excite a fluorescent substance contained in the latent image mark having desired information; and a light-receiving member for receiving fluorescence emitted from the surface of the latent image mark. A range in which the latent image mark can be read is formed by setting a point at which the optical axis of the light-projecting member and that of the light-receiving member intersect with each other as a reference. An intersection angle between the two optical axes is preferably in the range of from 10° to 40°.

13 Claims, 8 Drawing Sheets

OPTICAL READING APPARATUS FOR READING LATENT IMAGE MARK

TECHNICAL FIELD

The present invention relates to an optical reading apparatus for optically reading a latent image mark containing a fluorescent substance by projecting infrared rays to the latent image mark and optically detecting light emitted by the latent image mark. More particularly, the present invention relates to the disposition relationship between a light-projecting member and a light-receiving member of a handy optical reading apparatus for reading the information of the latent image mark by bringing the optical reading apparatus into contact with an object such as a commodity on which the latent image mark has been formed or moving it to a position close to the object.

BACKGROUND ART

In a conventional reflection type bar, printing ink containing carbon black is generally used. A bar code is printed on a sheet of paper with the printing ink, and a bar code reader optically detects the difference between the reflectivity of a bar code-printed portion of the paper and that of a bar code-unprinted portion thereof so as to read the code information which the bar code has.

The reflection type bar has, however, a disadvantage of causing errors in reading the information of the bar code in that the appearance of the commodity is damaged because the bar code is printed on the surface of a commodity or the like or the above-described reflectivity difference becomes small when the bar code-printed surface of the commodity is soiled.

In order to overcome the disadvantage, there are proposed various methods of printing a latent image mark containing fluorescent substances and projecting infrared rays to the latent image mark so as to optically detect light emitted by the latent image mark.

FIG. 12 is a view for describing this kind of conventional optical reading apparatus. A latent image mark 100 such as a bar code is printed on a mark carrier 101, for example, a commodity, a component or the like. The latent image mark 100 contains fluorescent fine powder. A projecting member 103 projects light for exciting the fluorescent substances and as a result, fluorescence is emitted by the latent image mark 100 and received by a light-receiving member 104, so that the code information of the latent image mark 100 is read optically.

When the above-described conventional optical reading apparatus is used as a handy optical reading apparatus, it is incapable of reading the code information of the latent image mark 100 correctly, thus causing erroneous detection and being unreliable in its performance.

Having made various researches on the causes, the present inventors found that the angle at which the optical axis of the projecting member 103 of the optical reading apparatus intersects with that of the light-receiving member 104 thereof and the state of the surface of the mark carrier 101 on which the latent image mark 100 has been printed relate to reading accuracy greatly.

That is, assume that the optical reading apparatus is mechanically fixed to a predetermined position; the latent image mark 100 is printed on the mark carrier 101 such as a sheet of paper having a flat surface; and the mark carrier 101 is guided by a guide member mounted on the optical reading apparatus. If the distance between the projecting member 103 and the latent image mark 100 and the distance between the light-receiving member 104 and the latent image mark 100 are always constant, the code information of the latent image mark 100 can be read comparatively correctly, even though the intersection angle $\theta$ formed between the optical axis of the projecting member 103 and that of the light-receiving member 104 is as great as 45°–60° as shown in FIG. 12.

In the case of a manually operated handy optical reading apparatus, the reading position of the light-receiving member 104 becomes nonuniform in relation to the latent image mark 100 or the detection aperture surface of the optical reading apparatus becomes oblique or moves in relation to the surface of the latent image mark 100. Further, when the surface state of the mark carrier 101 on which the latent image mark 100 has been printed is irregularly convex or concave as in the case of a confectionery bag, or curved or stepped as in the case of a component, the distance between the projecting member 103 and the latent image mark 100 and the distance between the light-receiving member 104 and the latent image mark 100 become nonuniform, respectively.

It has been found that in reading the code information of the latent image mark 100 in such a condition, if the intersection angle $\theta$ formed between the optical axis of the projecting member 103 and that of the light-receiving member 104 is as great as 45°–60°, the code information of the latent image mark 100 cannot be correctly read, thus causing erroneous detection of the code information of the latent image mark 100.

SUMMARY OF THE INVENTION

It is accordingly an object of the present invention to solve the above-described disadvantages and provide an optical reading apparatus for reading a latent image mark which is reliable and can correctly read the code information of image mark.

In order to achieve the aforementioned object, according to one aspect of the present invention, the optical reading apparatus is so constructed to comprise a light-projecting member (4) for projecting light on a surface of the latent image mark having a wavelength to excite a fluorescent substance contained in the latent image mark (15) having desired information; and a light-receiving member (8) for receiving fluorescence emitted from the surface of the latent image mark, a range in which the latent image mark can be read is formed by setting a point at which an optical axis of the light-projecting member and that of the light-receiving member intersect with each other as a reference, and an intersection angle between the two optical axes is restricted to 40° or less.

As described above, according to the present invention, even though the distance between the light-projecting member and the latent image mark and the distance between the light-receiving member and the latent image mark are nonuniform, adverse effect can be reduced to the utmost by setting the intersection angle between the two optical axes of the light-projecting and receiving members on the latent image mark to 40° or less. Thus, the present invention can provide a reliable handy optical reading apparatus capable of reading the latent image mark printed on the mark carrier regardless of whether the surface of the mark carrier is flat, irregular, curved or stepped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENT

Figure 1:
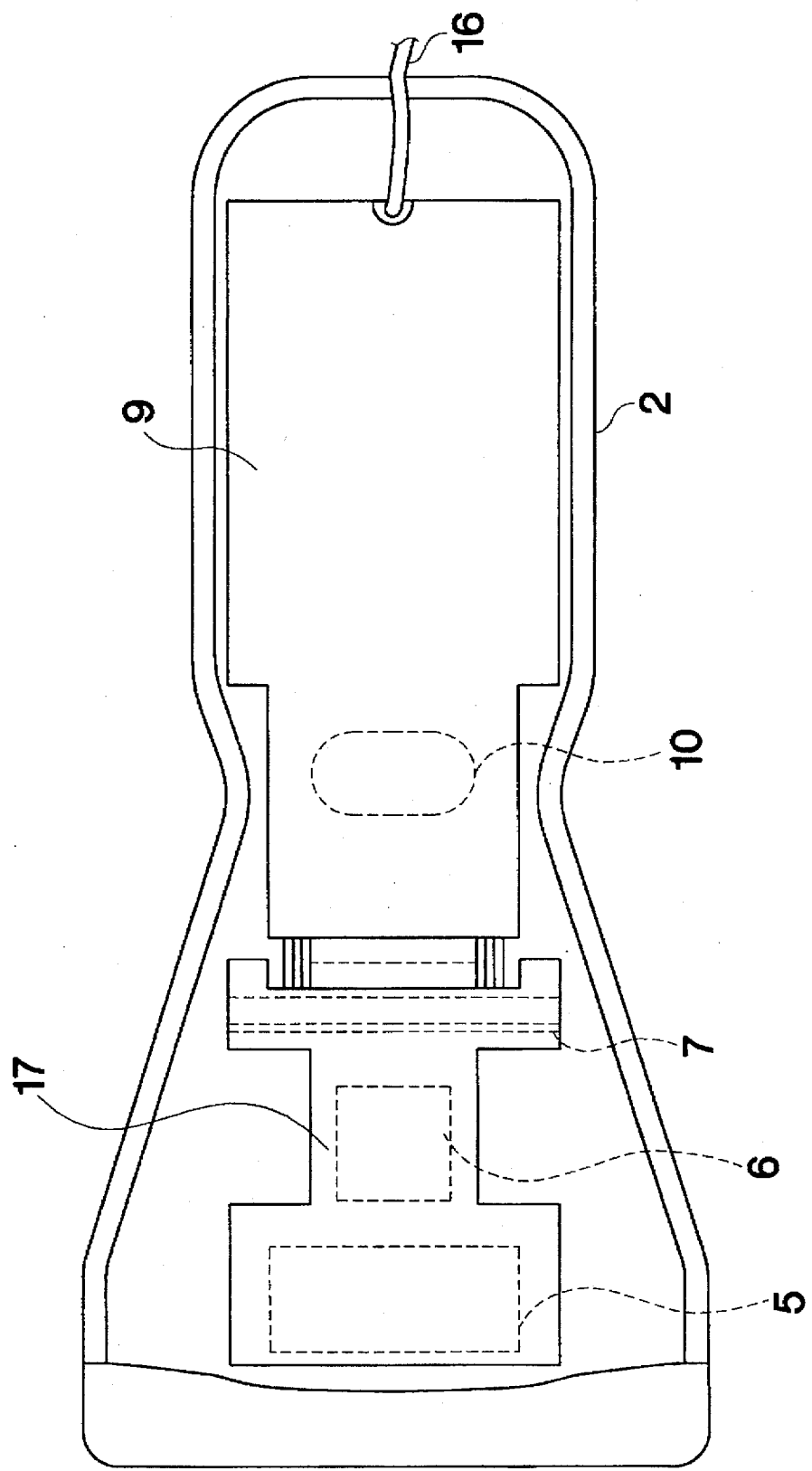
FIG. 1 is a plan view showing an optical reading apparatus, according to an embodiment of the present invention, in which some parts are cut out.

Before the description of the present invention proceeds, it is to be noted that like parts are designated by like reference numerals throughout the accompanying drawings.

An embodiment of the present invention is described below in detail with reference to FIGS. 1 through 6.

Figure 2:
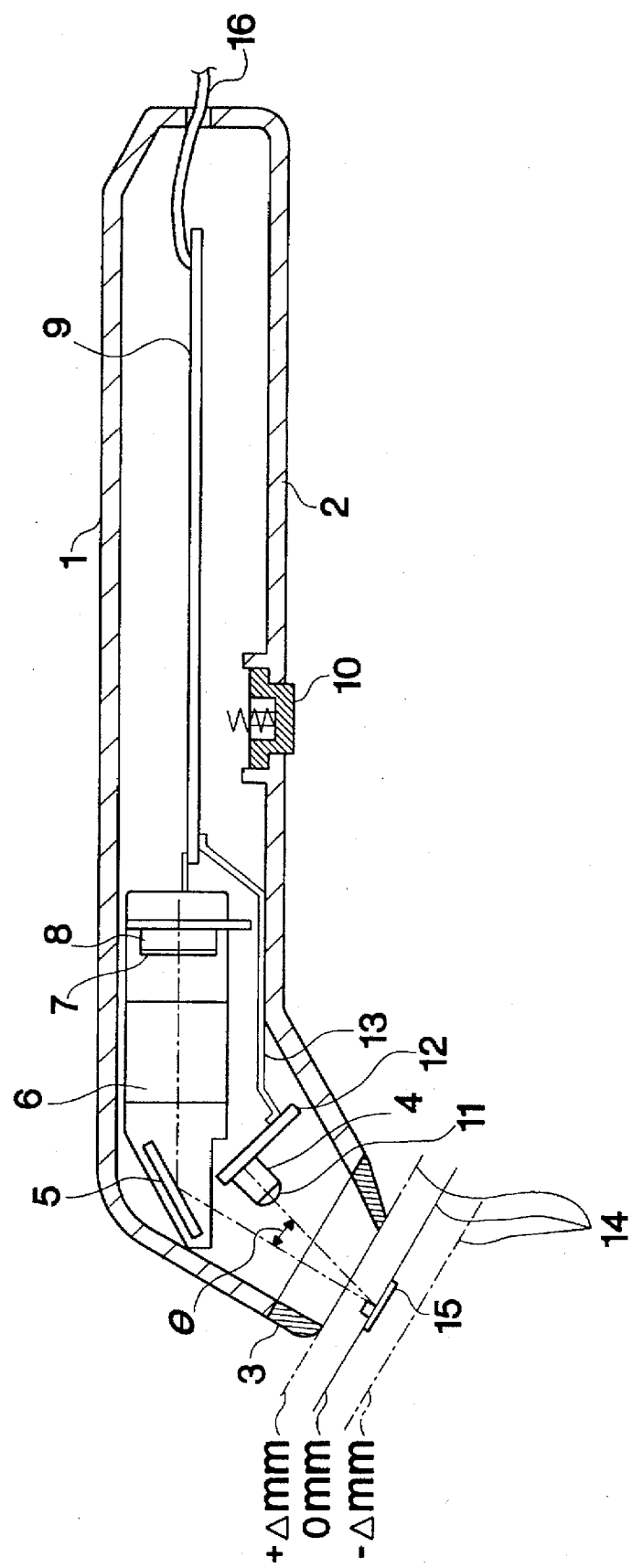
FIG. 2 is a sectional view showing the optical reading apparatus shown in FIG. 1.

As shown in FIG. 2, the optical reading apparatus according to the embodiment essentially comprises an upper casing 1; a lower casing 2; an aperture frame 3; a light-projecting element 4; a mirror 5; an image-forming lens group 6; an optical filter 7; a light-receiving element 8; a control board 9; and a switch 10.

As shown in FIG. 1, a material is molded into the upper casing 1 and the lower casing 2 molded in a configuration which can be easily held by hand, and the switch 10 is arranged at an operable position, with an operator holding the optical reading apparatus by hand.

Figure 5:
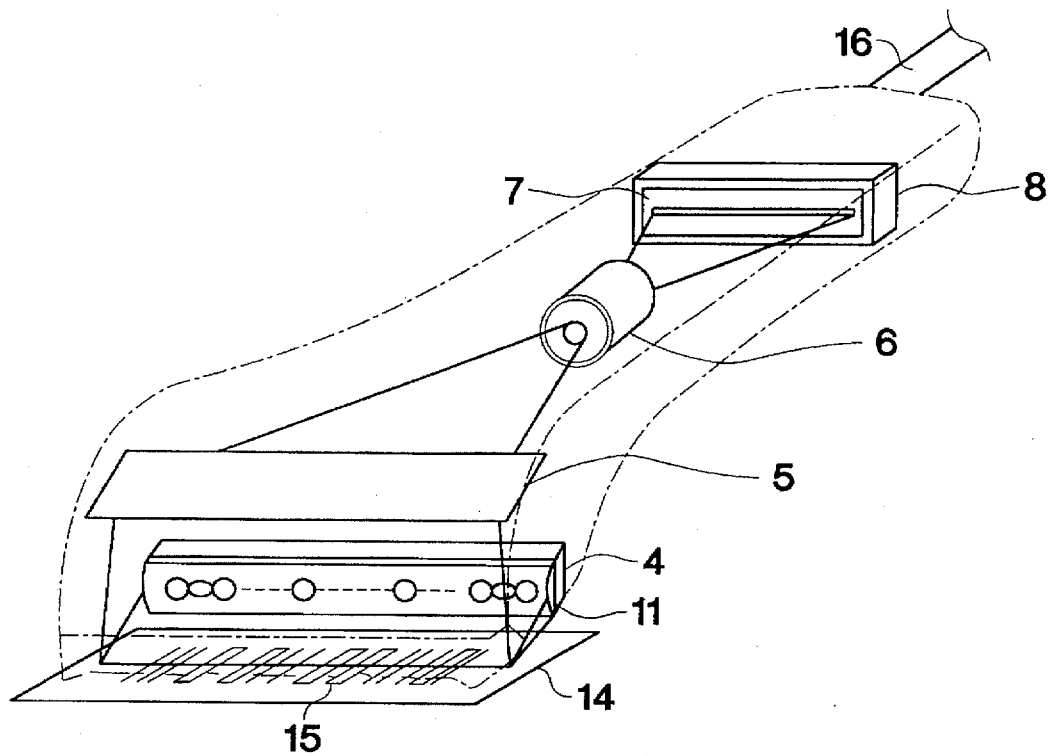
FIG. 5 is a schematic view for describing an optical system of the optical reading apparatus shown in FIG. 1.

As shown in FIG. 5, the light-projecting element 4 comprises a large number of LED elements arranged in a row to form an array shape, and a lens 11 is provided on the light-projecting side thereof. The light-projecting element 4 is supported by a printed board 12. The printed board 12 is fixed to the lower casing 2 accurately. The control board 9 and the printed board 12 are electrically connected with each other by a signal line 13.

Figure 6:
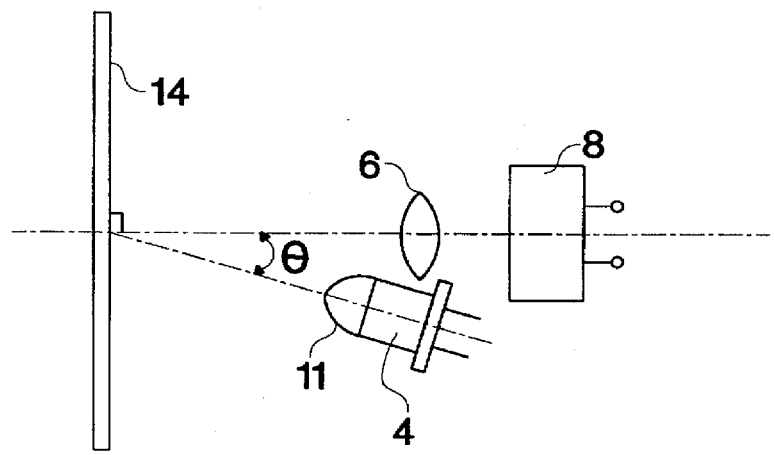
FIG. 6 is a schematic view for describing the optical system of the optical reading apparatus shown in FIG. 1.

The array-shaped light-projecting element 4 is fixed to a position close to the detection surface of an aperture of the optical reading apparatus and emits light to a latent image mark 15 such as a bar code-shaped latent image mark printed on the surface of a mark carrier 14. As shown in FIGS. 2 and 6, the light-projecting element 4 is so fixed that the optical axis thereof intersects at 15° with a normal to a surface, to be detected (in a case of a flat surface), on which the latent image mark 15 has been formed.

The light-projecting element 4 emits infrared rays. As a result, fluorescent fine powder contained in the latent image mark 15 is excited and as a result, the latent image mark 15 emits infrared rays having a central wavelength different from that of the infrared rays (fluorescence) emitted by the light-projecting element 4. The fluorescence is reflected by the mirror 5 disposed on the normal to the surface on which the latent image mark 15 has been formed and is received by the light-receiving element 8 via the image-forming lens group 6 and the optical filter 7.

The optical filter 7 has an optical characteristic of intercepting the infrared rays irradiated by the light-projecting element 4 and transmitting the infrared rays emitted by the latent image mark 15. The optical filter 7 is composed of a monocrystal substrate made of indium phosphorus (InP) or the like.

The light-receiving element 8 comprises a large number of CCD elements arranged in a row and forming an array shape. A detection signal outputted from the light-receiving element 8 is inputted to the control board 9, and then processed. The processed signal is inputted to an unshown personal computer via a cable 16.

Figure 3:
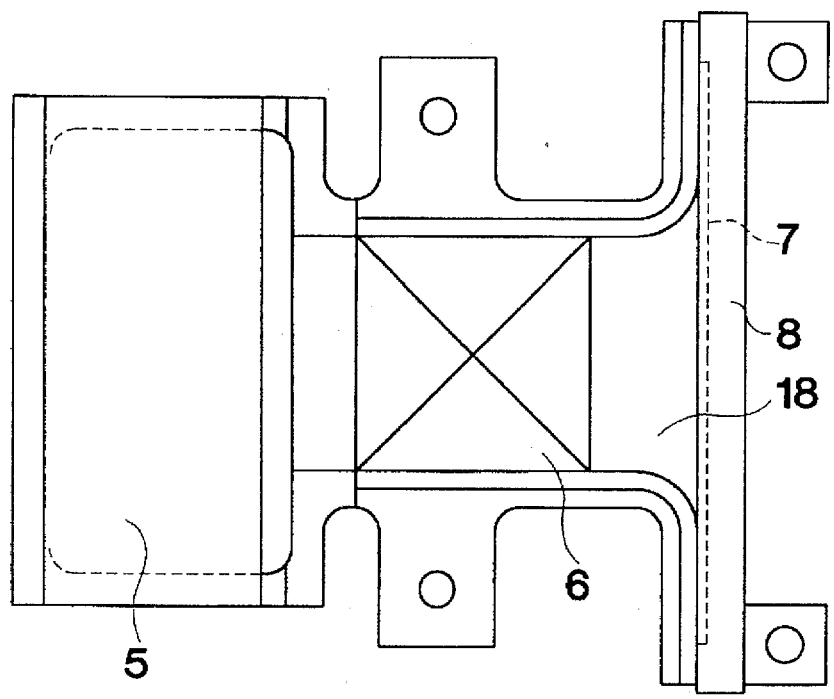
FIG. 3 is a plan view showing a state in which an upper frame of a unit, disposed on a light-receiving side, to be used in the optical reading apparatus of FIG. 1 is removed.
Figure 4:
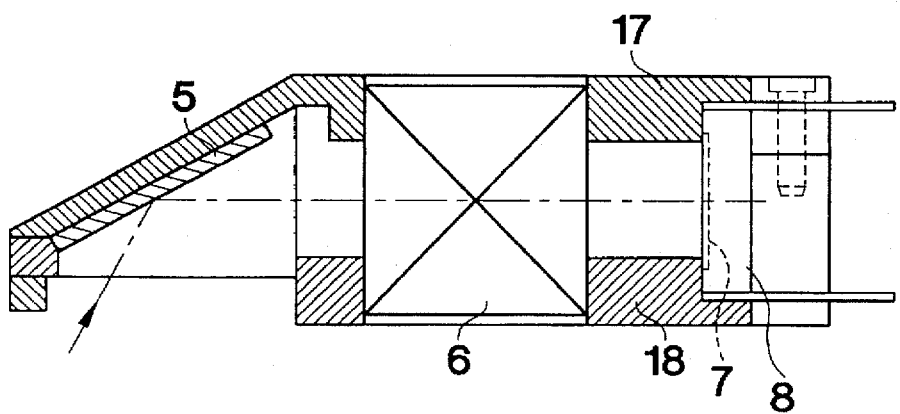
FIG. 4 is a sectional view showing the unit, disposed on the light-receiving side, shown in FIG. 3.

The mirror 5, the image-forming lens group 6, and the light-receiving element 8 are mounted in the upper and lower casings 1 and 2 by being sandwiched in position between the upper frame 17 and the lower frame 18, such that the mirror 5, the image-forming lens group 6, and the light-receiving element 8 are spaced from each other at an appropriate interval, as shown in FIGS. 3 and 4.

The latent image mark 15 comprises fluorescent fine powder and a binder having a property of transmitting infrared rays and holding the fluorescent fine powder in a dispersed state.

As the fluorescent substance, inorganic compounds comprising a matrix composed of fluoride or oxide such as phosphate, molybdate, or tungstate containing an emission center substance consisting of one element selected from neodymium (Nd), ytterbium (Yb), europium (Eu), thulium (Tm), praseodymium (Pr), and dysprosium (Dy) belonging to rare earth elements or a mixture thereof. Specifically, the following inorganic compounds can be used as the fluorescent substance: $NdP_5O_{14}$, $LiNdP_4O_{12}$, $NaY_{0.69}Yb_{0.3}Er_{0.01}F_4$ and the like.

Inorganic compounds expressed by the following general formula can be also used.

General formula: $Ln_{1-x-y}Nd_xYb_yZ$

The reference symbol Ln of the formula indicates one element or more selected from the group of Bi, Ge, Ga, Gd, In, La, Lu, Sb, Sc, and Y.

The reference symbol Z of the formula is $A_5(MO_4)_4$, where the reference symbol A is one element or more selected from the group of K and Na, and the reference symbol M is one element or more selected from the group of W and Mo;

$D_3 (BO_3)_4$, where the reference symbol D is one element or more selected from the group of Al and Cr;

$P_5O_{14}$;

$A_3 (PO_4)_2$, where the reference symbol A is one element or more selected from the group of K and Na.

$Na_2Mg_2 (VO_4)_3$; and $A' (MO_4)_2$, where the reference symbol A' is one element or more selected from the group of Li, K, and Na, and the reference symbol M is one element or more selected from the group of W and Mo.

Regarding reference symbols x and y of the formula, when Z is $A_5(M_{O4})_4$, x and y are numerical values in a range of $0.25 \leq x \leq 0.99$ and $0.11 \leq y \leq 0.75$;

when Z is $D_3 (BO_3)_4$, x and y are numerical values in a range of $0.10 \leq x \leq 0.99$ and $0.01 \leq y \leq 0.90$;

when Z is $P_5O_{14}$, x and y are numerical values in a range of $0.05 \leq x \leq 0.98$ and $0.02 \leq y \leq 0.95$;

when Z is $A_3 (PO_4)_2$, x and y are numerical values in a range of $0.02 \leq x \leq 0.98$ and $0.02 \leq y \leq 0.98$;

when Z is $Na_2Mg_2 (VO_4)_3$, x and y are numerical values in a range of $0.57 \leq x \leq 0.90$ and $0.01 \leq y \leq 0.43$;

when Z is $A' (MO_4)_2$, x and y are numerical values in a range of $0.20 \leq x \leq 0.95$ and $0.05 \leq y \leq 0.80$.

More specifically, the following substances can be used:

$Nd_{0.8}Yb_{0.2}Na_5 (WO_4)_4$, $Nd_{0.9}Yb_{0.1}Na_5 (M_{O4})_4$, $Y_{0.1}Nd_{0.75}Yb_{0.15} (WO_4)_4$, $Nd_{0.8}Yb_{0.2}Na_5 (Mo_{0.5}W_{0.5}O_4)_4$, $Bi_{0.1}Nd_{0.75}Yb_{0.15}K_5 (MoO_4)_4$, $La_{0.1}Nd_{0.8}Yb_{0.1} (Na_{0.9}K_{0.1})_5 (WO_4)_4$, and $Nd_{0.9}Yb_{0.1}Al_3 (BO_3)_4$ Further, inorganic substances expressed by the following general formula can be also used:

General formula: $EF_{1-x-y}Nd_xYb_yP_4O_{12}$

The reference symbol E of the formula indicates one element or more selected from the group of Li, Na, K, Rb, and Cs.

The reference symbol F of the formula indicates one element or more selected from the group of Sc, Y, La, Ce, Gd, Lu, Ga, In, Bi, and Sb.

The reference symbols x and y of the formula are numerical values in the following range:

$0.05 \leq x \leq 0.999$ $0.001 \leq y \leq 0.950$ $x+y \leq 1.0$

More specifically, the following substances can be used:

$LiNd_{0.9}Y_{0.1}P_4O_{12}$, $LiBi_{0.2}Nd_{0.7}Y_{0.1}P_4O_{12}$, and $NaNd_{0.9}Y_{0.1}P_4O_{12}$ Further, oxygenated salt such as phosphate, borate, molybdate, or tungstate containing at least one element selected from Y, La, Gd, and Bi; and Yb. More specifically, inorganic substances expressed by the following general formula can be used:

General formula: $A(Y, La, Gd, Bi)_xYb_{1-x}P_y O_z$

The reference symbol A in the formula indicates one element or more selected from the group of Li, Na, K, Rb, and Cs and is not an essential substance; the reference symbol x of the formula is a numerical value in the range of from 0.01 to 0.99; y of the formula is a numerical value in the range of from 2 to 5; and z of the formula is a numerical value in the range of from 7 to 14.

Favorably, the content of the fluorescent fine powder is suitably 10–80 wt % and more favorably 25–70 wt %. If the content of the fluorescent fine powder is less than 10 wt %, the emission output of the latent image mark 15 is too weak, while if the content of the fluorescent fine powder is more than 80 wt %, it is difficult to print the latent image mark 15 and further, there is a possibility that the latent image mark 15 is separated from the mark carrier 14, because the adhering strength of the mark is weak.

As the binder, a solvent-free type such as ultraviolet-curing resin which is hardened by ultraviolet rays, a solvent type such as polyurethane, and a water-soluble type such as polyvinyl alcohol (PVA) can be used and selected appropriately depending on the printing method or the quality of the material of an object to be detected. If necessary, a placiticizer or a surface active agent may be appropriately contained in the mixture.

As shown in FIG. 2, in the present embodiment, the focal length of the lens 11 is so designed that the focal length is slightly outwardly elongated from the detection aperture of the aperture frame 3 so that the mark carrier 14 can be read when the detection aperture is disposed in the vicinity of the latent image mark 15, even though the detection aperture is not brought into contact with the mark carrier 14.

As described previously, in the optical reading apparatus, the intersection angle θ, on the latent image mark 15, between the optical axis of the light-projecting element 4 and that of the light-receiving element 8 is set to 15°. A position at which the distance between the lens 11 and the latent image mark 15 coincides with the focal length of the lens 11 is set to a 0 mm-position (reference position) of the latent image mark 15, and the change in the output voltage of the light-receiving element 8 is measured by approaching the latent image mark 15 from the reference position to the apparatus and moving it away therefrom. The result is shown in FIG. 7.

Figure 7:
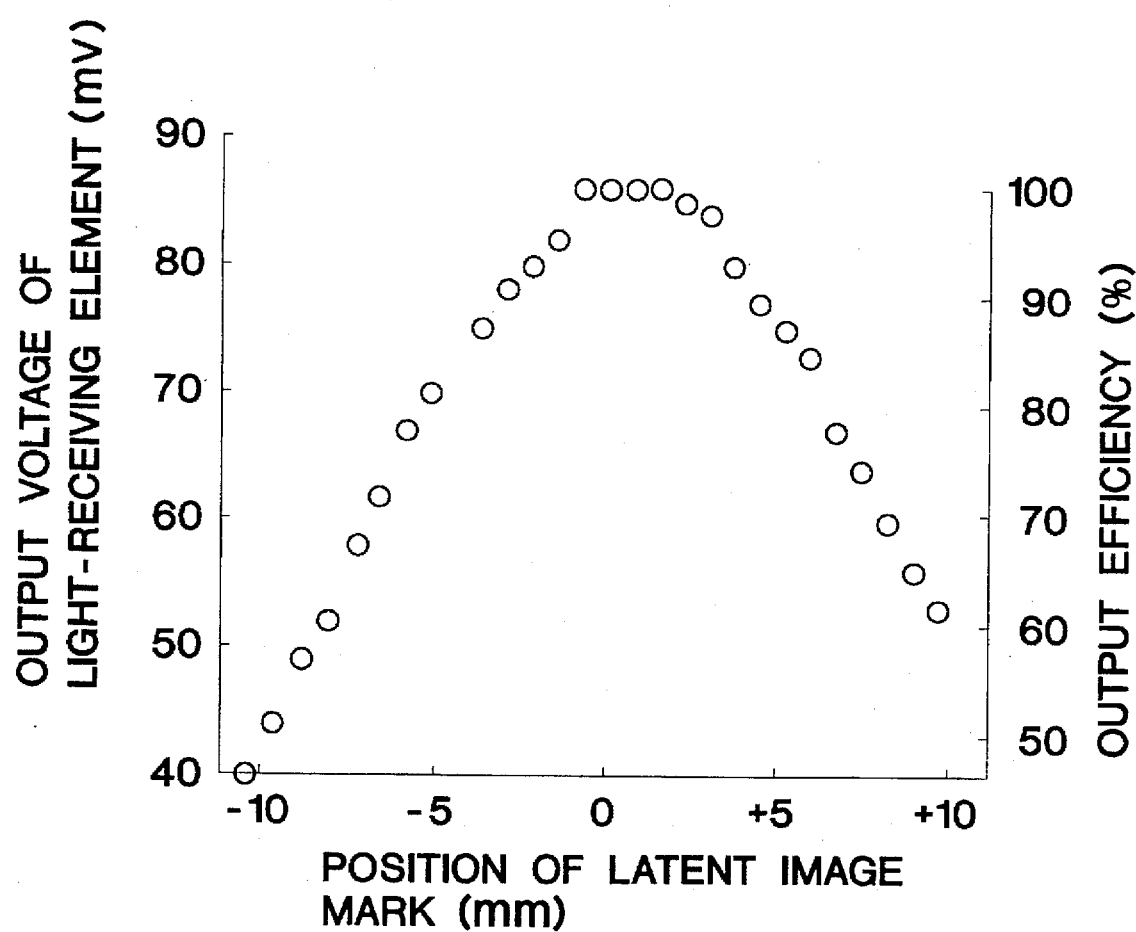
FIG. 7 is a characteristic view showing the relationship between the position of a latent image mark and the output state of a light-receiving element.

In FIG. 7, the abscissa indicates the position of the latent image mark 15; the left ordinate indicates the output voltage of the light-receiving element 8; and the right ordinate indicates the output efficiency of the light-receiving element 8 with respect to the output voltage of the light-receiving element 8 which is set to 100 when the position of the latent image mark 15 is 0 mm.

As apparent from FIG. 7, when the position of the latent image mark 15 is 0 mm, i.e., when the distance between the lens 11 and the latent image mark 15 coincides with the focal length of the lens 11, the output voltage of the light-receiving element 8 is highest. When the distance between the apparatus and the latent image mark 15 is longer or shorter than the focal length, the output voltage of the light-receiving element 8 drops in an approximately parabola configuration.

From results obtained by the present inventors' various experiments, it has been found that when the output efficiency of the light-receiving element 8 is less than 50%, S/N becomes small and thus the latent image mark 15 cannot be read correctly. Accordingly, in this embodiment (intersection angle θ=15°), the distance which can be read is a range between approximately +10 mm and approximately −10 mm (approximately 20 mm), with a position at which the output efficiency is 50%, namely, the reference position set to the center position. That is, in this embodiment, the range in which the latent image mark 15 can be read is formed in a range of about 20 mm from the outer surface of the light-projecting and light-receiving detection aperture to a certain position in the direction in which the latent image mark 15 moves away from the aperture.

Figure 8:
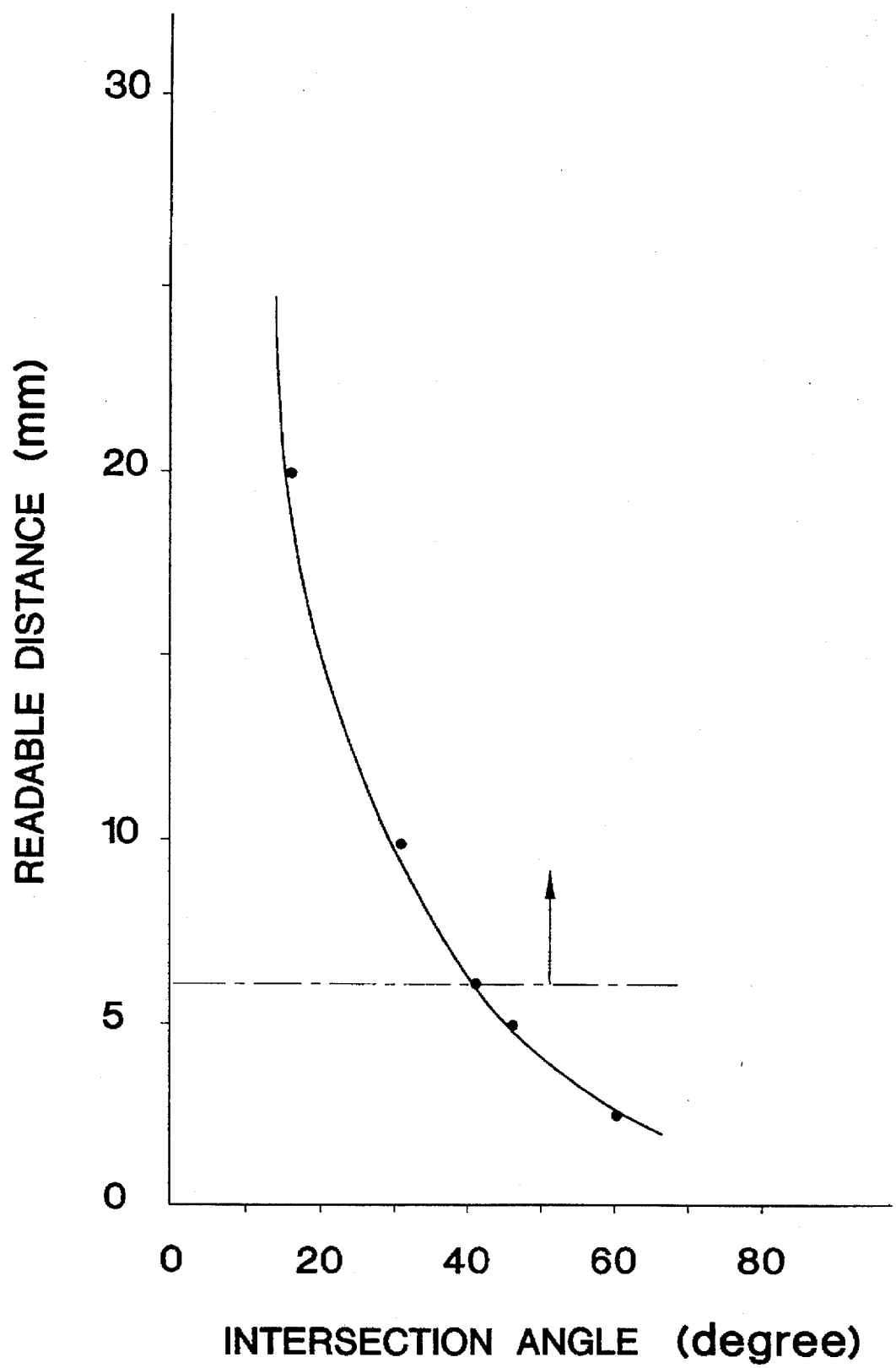
FIG. 8 is a characteristic view showing the relationship between an intersection angle between the optical axes of a light-projecting element and the light-receiving element and a readable distance of the latent image mark.

FIG. 8 is a view showing the change in the distance (the position at which the output efficiency of the light-receiving element 8 is 50%) which can be read when the intersection angle θ is varied.

As clear from FIG. 8, the distance which can be read becomes extremely short with the increase of the intersection angle θ. As in the case of the conventional apparatus, when the intersection angle θ is 45°, the maximum distance which can be read is 5 mm (±2.5 mm) or less, and hence, if the surface of the mark carrier 14 is irregular as in the case of a confectionery bag or curved in a small radius of curvature, the latent image mark 15 cannot be read reliably.

Because in a natural state, the difference between the highest portion of the surface (surface in a region in which the latent image mark 15 is printed) of a commodity such as a confectionery bag and the lowest portion thereof is approximately 6 mm (±3 mm) on the average, the latent image mark 15 can be read reliably if the readable distance is 6 mm or more. As apparent from the experimental result shown in FIG. 8, it is necessary to restrict the intersection angle θ to 40° or less so that the readable distance is 6 mm (±3 mm) or more. When the intersection angle θ is set to 30°, the readable distance increases to 10 mm (twice as large as the readable distance when the intersection angle θ is 45° in the conventional apparatus). When the intersection angle θ is set to 15°, the readable distance increases to 20 mm (four times as large as the readable distance when the intersection angle θ is 45° in the conventional apparatus). Thus, preferably, the intersection angle θ is set to 30° or less. But to set the intersection angle θ small causes the size of parts of the optical system such as the light-projecting element 4, the mirror 5, the image-forming lens group 6, and the light-receiving element 8 and the arrangement thereof to be in a limited condition. Thus, the preferably, the intersection angle θ is regulated in the range from 10°–30°.

Figure 9:
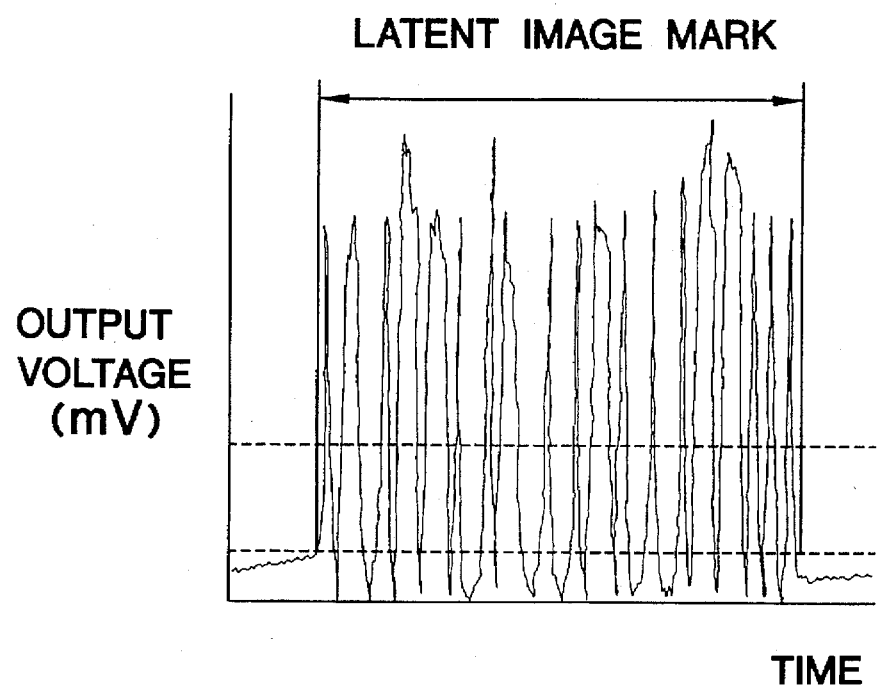
FIG. 9 is a view showing the output state of the optical reading apparatus in a case where the surface of a mark carrier is flat.
Figure 10:
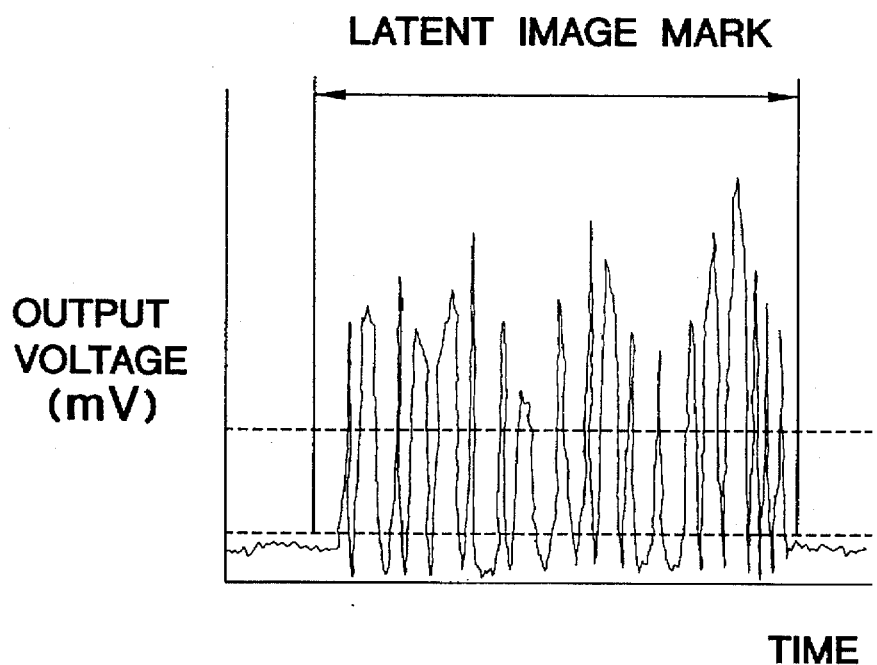
FIG. 10 is a view showing the output state of the optical reading apparatus in a case where the surface of the mark carrier is concave and convex.

FIGS. 9 and 10 are views showing the reading state, obtained by using the optical reading apparatus (intersection angle θ=15°), of the bar code-shaped latent image mark 15, the minimum width of which is 0.5 mm, printed on a sheet of paper. FIG. 9 is a view showing the output state of the light-receiving element 8 in the case of a flat sheet of paper. FIG. 10 is a view showing the output state thereof in the case where a sheet of paper is wrinkled to set, to about 6 mm (±3 mm) on the arrange, the difference between the highest portion of the surface of the paper in a region in which the latent image mark 15 is printed and the lowest portion thereof.

Figure 11:
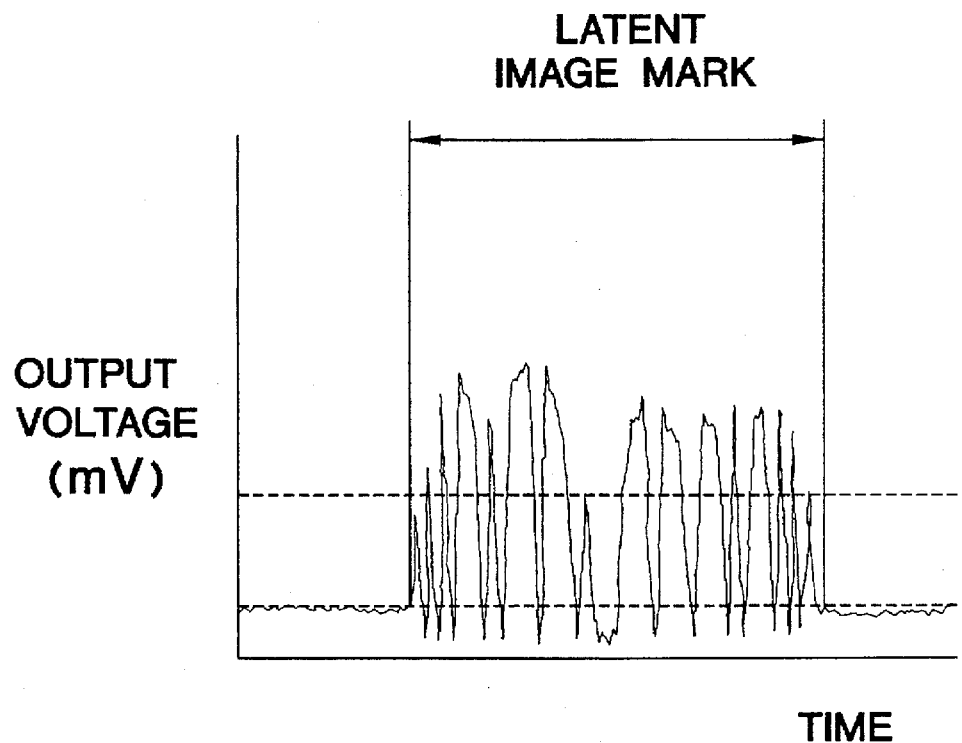
FIG. 11 is a view showing the output state of the optical reading apparatus in a case where the surface of the mark carrier is curved.
Figure 12:
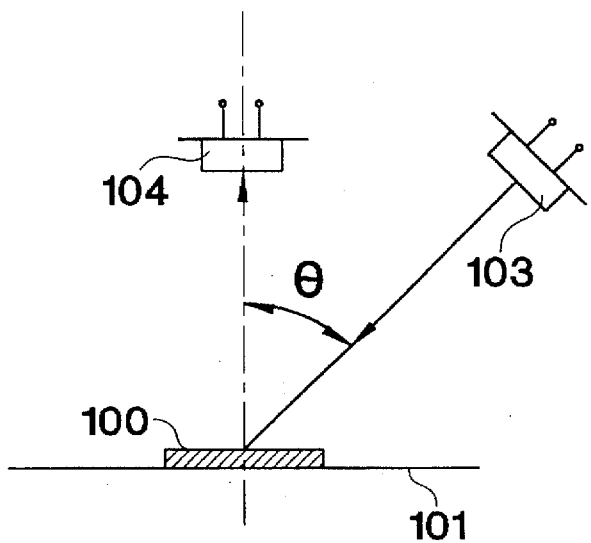
FIG. 12 is a schematic view showing a conventional optical reading apparatus.

FIG. 11 is a view showing the output state of the light-receiving element 8 in the case (distance between the optical reading apparatus and the latent image mark 15 is 6 mm) where the bar code-shaped latent image mark 15, the minimum width of which is 0.6 mm, is printed on a sheet of paper curved in a radius of curvature of 15 mm and the latent image mark 15 is read by the optical reading apparatus (intersection angle θ=15°).

As apparent from FIGS. 10 and 11, it can be proved that by using the optical reading apparatus according to this embodiment, the latent image mark 15 can be reliably read regardless of whether the surface of the mark carrier 14 is flat, irregular with a large difference between the highest and lowest portions thereof, or curved.

In the above-described embodiment, the fluorescent substance excited by projected infrared rays has been described, but the present invention is applicable to an optical reading apparatus using a fluorescent substance excited by projected ultraviolet rays.

In comparing the fluorescent substance excited by ultraviolet rays and the fluorescent substance excited by infrared rays with each other, in the former, fluorescence is visible whereas in the latter, fluorescence is invisible. Thus, the latter is advantageous in security and has a long life and hence can be more favorably used than the former.

As described above, the range in which the latent image mark 15 can be read is formed by setting a point at which the optical axis of the light-projecting member (for example, the light-projecting element 4) and that of the light-receiving member (for example, the light-receiving element 8 and the optical frame 7) intersect with each other as the reference. Further, even though the distance between the light-projecting member and the latent image mark and the distance between the light-receiving member and the latent image mark are nonuniform, adverse effects can be reduced to the utmost by setting the intersection angle between the two optical axes to 40° or less, preferably 10° to 40°, and more preferably 10° to 30°, and even more preferably 15°. Thus, the present invention can provide a reliable handy optical reading apparatus capable of reading the latent image mark printed on the mark carrier regardless of whether the surface of the mark carrier 14 is flat, irregular, curved or stepped.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical reading apparatus for reading a latent image mark, comprising:

a light-projecting member for projecting on a surface of the latent image mark light having a wavelength to excite a fluorescent substance contained in the latent image mark having desired information;

a light-receiving member for receiving fluorescence emitted from the surface of the latent image mark;

a mirror for reflecting the fluorescence emitted from the surface of the latent image mark onto the light-receiving member;

an image forming lens group for transmitting the fluorescence emitted from the surface of the latent image mark onto the light-receiving member;

an upper frame and a lower frame having said light-receiving member, said image forming lens group, and said mirror located therein such that said light-receiving member, said image forming lens group, and said mirror are spaced from each other by a fixed interval; and an enclosure enclosing each of said light-protecting member, said upper frame and said lower frame, wherein a range in which the latent image mark can be read is formed by setting a point at which an optical axis of the light-projecting member and that of the light-receiving member intersect with each other as a reference; and an intersection angle between the two optical axes is in the range of from 10° to 40°.

2. The optical reading apparatus according to claim 1, wherein the intersection angle is restricted to be in the range from 10° to 30°.

3. The optical reading apparatus according to claim 1, wherein the light-projecting member and the light-receiving members are held by casings; and the range in which the latent image mark can be read is formed in a range from an outer surface of a light-projecting and light-receiving detection aperture of the casings to a certain position in a direction in which the latent image mark moves away from the aperture.

4. The optical reading apparatus according to claim 1, wherein the fluorescent substance is excited by infrared rays.

5. The optical reading apparatus according to claim 1, wherein the fluorescent substance is excited by ultraviolet rays.

6. The optical reading apparatus according to claim 1, wherein the optical reading apparatus is a portable, hand-held unit.

7. The optical reading apparatus according to claim 1, wherein the light-projecting member includes a plurality of light emitting elements arranged in an array.

8. The optical reading apparatus according to claim 1, wherein the light-receiving member includes a plurality of light receiving elements arranged in an array.

9. The optical reading apparatus according to claim 1, wherein the intersection angle is approximately 15°.

10. The optical reading apparatus according to claim 1, further comprising an optical filter for intercepting rays emitted by the light-projecting member and transmitting the fluorescence emitted by the latent image mark.

11. The optical reading apparatus according to claim 1, further comprising an optical filter for intercepting rays emitted by the light-projecting member and transmitting the fluorescence emitted by the latent image mark.

12. The optical reading apparatus according to claim 11, wherein said enclosure is a portable hand-held enclosure further enclosing said optical filter.

13. The optical reading apparatus according to claim 12, wherein the intersection angle is approximately 15°.

* * * * *